United States Patent

[11] 3,631,493

[72] Inventor George H. Balding
 Salt Lake City, Utah
[21] Appl. No. 860,267
[22] Filed Sept. 23, 1969
[45] Patented Dec. 28, 1971
[73] Assignee Kaiser Aerospace & Electronics
 Corporation
 Oakland, Calif.

[54] TERRAIN PROFILE GENERATOR
 13 Claims, 4 Drawing Figs.
[52] U.S. Cl. ................................................. 343/5 SC,
 343/6 TV, 343/7 TA
[51] Int. Cl. ....................................................... G01s 7/06
[50] Field of Search ............................................ 343/6 TV, 7
 ED, 7 TA, 5 SC

[56] References Cited
 UNITED STATES PATENTS
 3,501,762 3/1970 Klees.......................... 343/6

Primary Examiner—T. H. Tubbesing
Attorney—Johnson, Dienner, Emrich, Verbeck & Wagner ABSTRACT: A signal converter for converting terrain representative signals obtained in a radar scan into a display of a profile line on a cathode-ray tube of the terrain which is scanned. Electronic switches gate the detected radar information to capacitors in a storage matrix, and emitter followers are used in a readout circuit operated at the horizontal scan frequency to selectively gate the stored information over mixing diodes to a first clipper circuit for conversion to video signals. A second clipper circuit is used with the first clipper circuit to provide a thin profile line which is presented as an overlay to the presentation provided by video signals from a conventional television camera.

Patented Dec. 28, 1971

3,631,493

INVENTOR
GEORGE H. BALDING

BY Johnson Dienner Emrich Verbeck & Wagner
ATTYS.

TERRAIN PROFILE GENERATOR

BACKGROUND OF THE INVENTION

1. Field of the Invention

The invention pertains to electronic waveform generators for providing a terrain profile line on a cathode-ray tube for guidance of the aircraft pilot.

2. Description of Prior Art

With the development of aircraft which operate at increasingly higher speeds, there has been a corresponding increase in the amount of data and information which must be made available to the aircraft pilot for the purpose of evaluating the aircraft performance and location. As a result, the aircraft instrument panel has been fully utilized, and the solution to the problem of locating space for the mounting of additional display equipment has become increasingly more difficult.

With the development of the art, it is becoming further apparent that the use of cathode-ray tubes as display equipment (rather than mechanical instruments) will make possible the display of an increasing amount of information in the same display area. That is, a cathode-ray tube does not have the display constraints as a mechanical device in that different types of information can be presented on the face of the same cathode-ray tube, and the information previously preselected on several different mechanical displays can now be integrated into a single presentation on a cathode-ray tube. As a further solution to the problem of insufficient space, the art has also provided signal conversion equipment which makes possible the presentation on the same cathode-ray tube radar information which was previously presented on two separate cathode-ray tubes.

One example is the signal conversion equipment, such as disclosed in U.S. Pat. No. 3,246,330 which issued to me on Apr. 12, 1966, which is used in the presentation of terrain profile and terrain plan information on the same display. In such system the pilot could selectively obtain a presentation of the profile of the actual terrain the ground path of the aircraft which is, in effect, a display of range vs. elevation angle, and alternatively could obtain a terrain clearance display which is in effect a display of the contour of the terrain as viewed by the pilot through the aircraft windshield.

As noted in such patent, the relative frequency rate of the antenna scans (as for example 1 cycle per second) and the relative fast scan of a conventional television display (the horizontal rate of 15,750 cycles per second and a vertical line rate of 60 cycles per second), made the presentation of the radar-derived information on a television display a difficult problem, and the generator set forth therein was an important step forward in the art. It has now been determined that in certain modes of flight, it is desirable that television camera video information be provided to the pilot, and that such information be presented on the same cathode-ray tube which is used to provide terrain profile information. In some instances, the TV camera video signals are to be presented independently, and in others the camera video signals are to be presented with terrain profile information superimposed thereon.

It is an object of the present invention therefore to provide a novel converter which converts radar signals to video signals for display in usable form with the signal output of a TV video camera.

It is a further object of the present invention to provide a storage matrix having an improved reading and readout circuit for the information which is obtained in the radar scan. That is, in the terrain profile system of the above-identified patent, the radar video is azimuth gated and processed into a storage matrix composed of a plurality of capacitor elements for each azimuth sector of the profile to be displayed. Readout gates are operated at the horizontal TV frequency to sample the radar data information stored in each of the capacitors, and the sampled signals are routed over mixing diodes and fed with a vertical sawtooth signal to a clipper to provide a composite video signal for the display tube. Although the presentation was indeed an excellent portrayal of the terrain profile, the capacitance of the diodes which fed the signals to the clipper circuit tends to show up in the display. That is, in instances where sharp vertical lines are to be presented on the display, the capacitance of the diodes would introduce a slope into the line and the sharp vertical presentation was difficult to achieve. The obvious steps to be taken in an attempt to solve the problem were not successful. If, for example, a resistance is connected to the opposite side of the diode for the purpose of draining the capacitance of the diode to ground, the resistance added to the circuit will rob the storage capacitor of its charge, and in successive raster displays, the terrain profile line jumps up and down in a disturbing manner to the viewer. On the other hand, if the value of the resistance is reduced, it is necessary to use larger value capacitors to retain the charge (which requires considerably more current to charge the capacitor with a corresponding resultant delay). Further, in view of the large number of capacitors which are employed, the cost of such approach in addition to not entirely solving the problem, tends to be prohibitive.

It is a further object of the invention therefore to provide a storage matrix circuit which utilizes a less expensive arrangement while yet providing an improved, more sharply defined presentation of the real world information fed in over the antenna system.

BRIEF DESCRIPTION OF DRAWINGS

In the accompanying drawings.

GENERAL DESCRIPTION

Figures 1, 2, 3, 4:
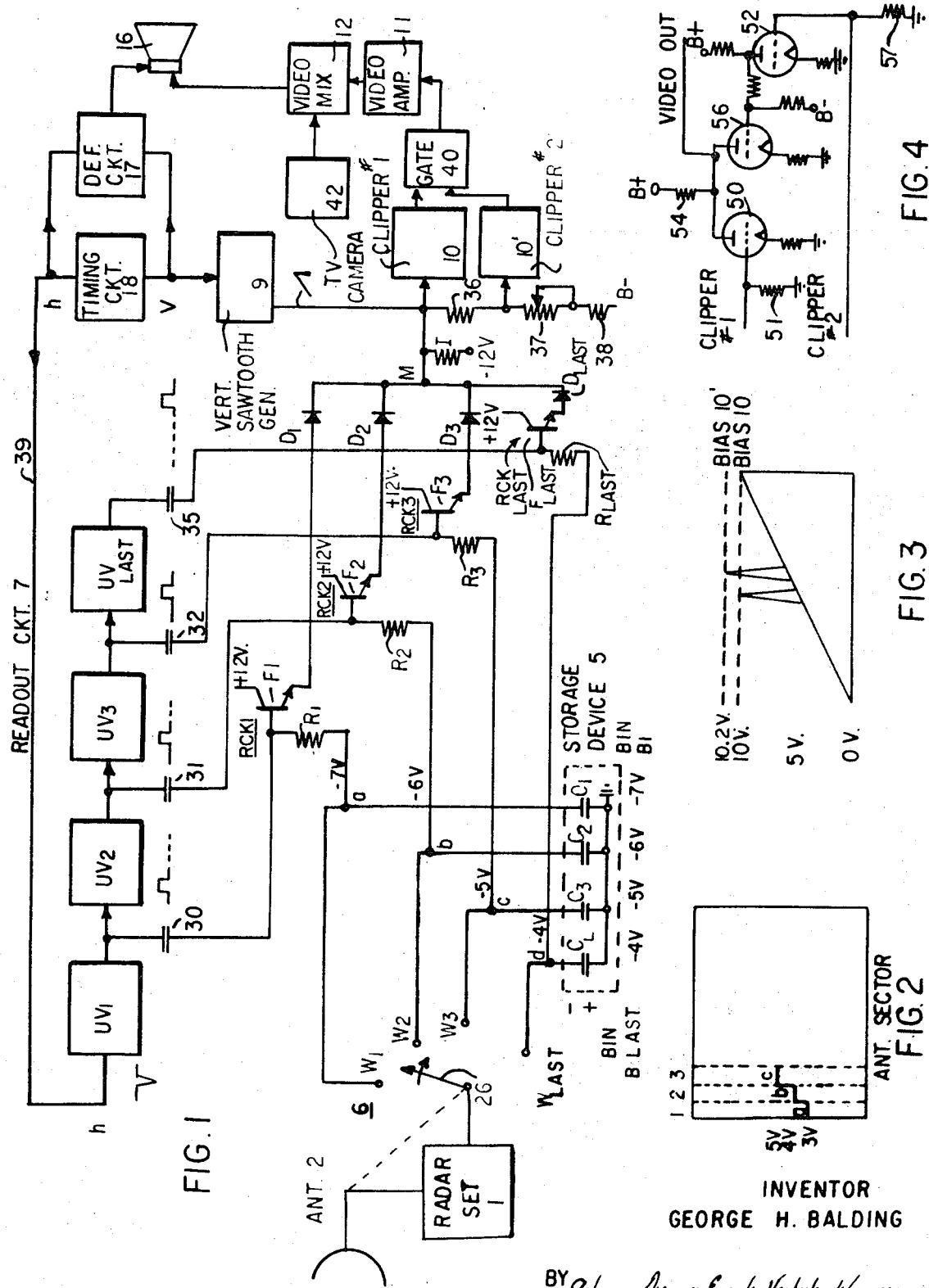
FIG. 1 sets forth the novel terrain profile generator for providing a profile line in combination with a TV camera video input on a common display including the novel storage matrix of the disclosure.
FIG. 2 is a partial presentation of a profile line which would be presented with the provision of representative radar signals.
FIG. 3 is an illustration of the manner in which the double clipper waveform output provides the narrow profile line.
FIG. 4 is a circuit diagram of a gate which may be used with the clipper circuits in the presentation of the profile line.

The terrain profile generator is utilized with a radar system which scans the terrain which lies in an azimuth sector which extends in the path of the aircraft and which provides a radar video output signal having a voltage whose amplitude is a function of azimuth and range to the terrain. In that the antenna is operated through one cycle each 3 seconds (left to right and right to left), the information representative signals relative to any given position in the scan is repeated at such rate. In converting the information provided by these low-frequency signals into signals which will display the information on a display unit such as a cathode-ray tube in which a raster-type scan is used having a horizontal sweep rate of 15,750 cycles per second and a vertical sweep rate of 60 cycles per second, the generator gates the signals received in a scan into a storage matrix, and samples such information in each capacitor at the horizontal rate of the raster. The sampled signals are thus fed over mixing diodes and fed with a vertical sawtooth to a clipper circuit to provide a composite video signal for the cathode-ray tube.

SPECIFIC DESCRIPTION

Signal Detection

With reference to FIG. 1, the terrain profile generator of the present invention is set forth thereat. As there shown, a radar set 1 includes an antenna 2 which is operative in a horizontal plane (from left to right in 1.5 seconds and back again in a like time) to scan the terrain directly in front of the aircraft in a total of 3 seconds. Such equipment may be any one of a number of commercially available sets including, for example, the radar set AN/ASQ-38 obtainable from Raytheon Corporation, Massachusetts.

Antenna 2 is operated by a mechanical means (not shown) through a horizontal plane in the direction of flight to obtain radar echoes which are a function of the terrain elevation. In the illustrated installation, the antenna 2 is operated through a 90° sector which ranges approximately 45° to either side of the projected ground track.

Signal Storage

The signals provided by the radar set as the antenna 2 is operated through each scan, are fed to the movable wiper arm 26 on a switch 6, which wiper arm is operated into engagement succeedingly with each contact W1–W last (40 in the present example) once in each azimuth scan by the antenna 2. It is apparent that the video information provided by radar set 1 in each azimuth scan is thereby effectively divided into 40 bits. While switch 6 is shown as a mechanical switch in FIG. 1, it is apparent that electronic switching can be used as well.

Each contact position W1–W last of the switch 6 is connected to a discrete one of the bins B1–B last in storage device 5.

As antenna 2 is in the initial part of its sweep, the output signals of the radar system 1 (which is a negative signal) is coupled over wiper 26 of switch 6 and contact position W1 on switch 6 to charge the capacitor C1 in bin 1 of the storage device 5 to a value related to the amplitude of the video signal output from the radar set 1. Since the incoming signals provided by the radar system 1 are proportional to the terrain height detected, capacitor C1 is provided with a signal which represents the profile of the terrain as detected by the radar system during the initial segment or sector of the scan. As the antenna is moved through a further angle of scan, wiper 26 of switch 6 advances in synchronism and signals indicative of the terrain height at the corresponding segment or sector of antenna scan will be coupled to the corresponding one of the bins B1–B last which is connected to the radar system at the time.

It will be apparent that at the end of a complete antenna scan of 90°, signals representative of the 40 different sectors of the scan are registered on capacitors C1–C last of bins B1–B last in the storage device 5. By way of a specific example, it will be assumed in an azimuth scan, the signal output may vary from −10 to 0 v. It will be further assumed for exemplary purposes that the elevation of the terrain is such that the antenna 2 in its first sector of scan provides a video input signal over radar system 1 which is 7 volts negative, and that capacitor C1 will therefore be charged to −7 volts, and that the elevation at the second segment of scan is such as to provide a −6 volt charge in capacitor C2, and that the elevation detected in the third segment is such as to place a −5 volt charge on capacitor 3, and the elevation detected in the last segment is such as to place a −4 volt charge on capacitor C last (C40).

It will be apparent that with the capacitors thus charged, corresponding potential values appear at points, such as $a,b,c$ in the circuit, and that the set of potential values on the 40 bins is representative of the terrain profile detected by the radar set. It will be further apparent that as the profile of the terrain detected by the radar set 1 changes, the value of the signal stored in the bins in the storage device 5 likewise changes, whereby the profile of detected terrain is continually represented by the voltage values on the capacitors C1–C last and the points, such as $a,b,c$.

Signal Readout

The stored signals are sampled cyclically for presentation on the cathode-ray tube display by a readout circuit 7 which is in turn controlled by timing circuit 18 for the cathode-ray tube display 16. The timing generator 18 may be of the type conventionally used in commercial television equipment which is operative to provide horizontal sync output pulses at the rate of 15,750 cycles per second, and vertical sync pulses at the rate of 60 cycles per second over conductors $h$ and $v$ respectively, to deflection circuitry 17 which operates in a conventional manner to generate a raster at the 60 cycle rate on the cathode-ray tube 16.

The horizontal pulses output over conductor $h$ to effect generation of successive horizontal lines on the raster of cathode-ray tube 16 are also fed over conductor 39 to the input circuit for readout circuit 7.

The readout circuit 7 which may be of the type set forth in my above-identified patent basically comprises a plurality of $n$ delay or sampling gates UV1–UV last which are connected in a cascade arrangement ($n = 40$ in the present embodiment), each one of the delay gates UV1–UV last being connected to provide a signal which effects readout of the information on a different one of the storage bins B1–B last at different successive time intervals in each horizontal line trace of the raster on cathode-ray tube 16. Each delay gate, such as UV1 basically comprises a one-shot multivibrator which is operative, as enabled, to generate a positive square wave pulse (which in the present embodiment is of a 10 volt amplitude) and to couple such pulse to an individual readout circuit RCK1 which is connected to sample an associated one of the bins, such as B1 in the storage device 5. Each readout circuit, such as RCK1 includes a transistor F1 which may be of the type commercially available as 2N2925, connected as an emitter follower. The collector of the transistor F1, for example, is connected to B+ (+12 volts in the present example); the base is connected (a) over a coupling capacitor 30 to the output of the first delay gate UV1, and (b) over resistor R1 to the sampling point "$a$" for the first bin B1; and the emitter is connected over diode D1 to the mixing point M for the readout circuits RCK1–RCK last.

The delay circuits UV1–UV40 are enabled by each horizontal pulse on conductor $h$ to generate a chain of 40 output pulses in sequence. More specifically, as a negative horizontal pulse is coupled to the input circuit of delay gate UV1 the first delay circuit UV1 will, after a brief delay described in the above-identified patent, apply a positive 10-volt readout pulse over coupling capacitor 30 to the first readout circuit RCK1. The same pulse is also fed to the next delay circuit UV2 in the sequence which operates as the first pulse output from UV1 is terminated to generate a 10-volt pulse over coupling capacitor 31 to the second readout circuit RCK2 for the second bin 2.

The successive multivibrators, UV3–UV last trigger one another in sequence, the length of the pulses generated by the circuits being correlated to the time of the horizontal line trace on the raster whereby the last multivibrator UV last will provide a sampling pulse at the terminating end of the horizontal line trace. Thus in a system in which there are 40 storage bins, the horizontal trace is 63 $\mu$ sec., and 10 $\mu$ sec. is used for retrace, each of the multivibrators, such as UV1, will be adjusted to provide a sampling pulse of 1.32 $\mu$ sec.

As a first readout pulse is coupled over capacitor 30 to the base of the transistor F1, the potential at the base of transistor F1 is the algebraic sum of the plus 10-volt pulse output from the one-shot multivibrator UV1 in the readout circuit 7 over capacitor 30, and the voltage which is stored in bin 1 (−7 volts in the present example). The resultant readout pulse will therefore traverse from −7 to +3 volts and the transistor F1 will provide such changing signal over diode D1 to the mixing point M.

As the next sampling or readout pulse is generated by multivibrator UV2 and coupled over capacitor 31 to the second readout circuit RCK2, a plus 4-volt pulse is provided over emitter-follower F2 and over diode D2 to the mixing point M (+10-volt pulse and −6-volt storage = +4 volts). The manner in which a train of 40 successive sampling pulses is provided over diodes D1–D last to mixing point M in each horizontal line trace of the raster will be apparent therefrom.

In the present circuit arrangement, the storage capacitor in bins B1–B last is looking into 3–5 megohms of the emitter-followers F1, F2, and accordingly there is no power drain or leakage from the capacitors such as is experienced if a resistance is coupled directly to the capacitor. In addition, because of the small power requirements by the novel arrangement, a smaller value storage capacitor may be used (by way of example, the circuit shown in the above-identified patent required 150-microfarad storage capacitors whereas the present arrangement permits the use of a 2-microfarad storage capacitor). As a result of the use of the smaller size capacitor in the storage bins, the capacitors will charge faster and the storage elements will have a faster response time as the information is input thereto. Thus, several advantages including improved display presentation, faster response time and reduced cost are experienced in the use of the new and improved storage and sampling circuits.

Composite Video Signal Generation

The 40 signals which are output over the diodes D1-D last in each horizontal line scan of the raster provide a composite waveform which has the profile of the radar detected terrain at the horizontal rate (15,750 cycles per second) of the TV system. The composite waveform generated in each line trace appears at mixing point M which is connected over resistor I to 12 volts and to the input of a first and second clipper circuit 10, 10'. A voltage divider circuit including resistors 36, 37, 38 is connected from the input of clipper circuit 10 to −12 volts potential source, and the input for clipper 10' is connected between resistor 36 and adjustable resistor 37.

A vertical sawtooth generator 9 which is enabled by each vertical sync pulse output from timing circuit 18 generates a vertical sawtooth waveform at the raster rate of the monitor 16 which is fed to the input circuit for clipper circuit 10 and clipper circuit 10'. The second clipper circuit 10' which is connected between the resistance members 36, 37 of the voltage divider is biased to operate at a higher signal level than the clipper circuit 10.

Clipping circuit 10, which may be of the structure shown in the above-identified patent, effects conversion of the sampled signals as mixed with the vertical sawtooth signal to video signals for the cathode-ray tube 16. In the present example, clipper 10 is initially biased so that as the first line of the raster is traced (and the vertical sawtooth waveform is at its lowest value) a sampled signal input to the clipper of +10 volts as added to the value of the vertical sawtooth output from vertical sawtooth generator 9 is sufficient to turn on clipper 10 which in turn provides an output video signal. Thus, sampled signals less than 10 volts in value during the first horizontal line trace will not enable the clipper 10 and there will be no video output.

With the successive horizontal line traces of the raster the amplitude of the vertical sawtooth output from sawtooth generator 9 increases (see FIG. 3). In the present example in which it is assumed that the signal over the first mixing diode D1 is +3 volts, and the voltage signal fed over the second mixing diode D2 is +4 volts, and the signal over the third mixing diode is +5 volts, it will be apparent that the clipper 10 will be cut off during the line traces which occur in the upper portion of the raster trace (see FIG. 2). As the raster progresses vertically downwardly to the approximate center of the screen, the +5 volt signal output over diode D3 will be sufficient to cause clipper 10 to conduct during the period in the line trace that the third multivibrator UV3 provides the sampling signal of +5 volts over diode D3. As clipper 10 conducts, an output video signal is applied through gate 40 (to be described), video amplifier 11 and video mixer 12 to the electron gun of the cathode-ray tube device 16 to cause same to conduct for such time period and provide the segment trace A (FIG. 2) on the display tube. Stated in another manner, the value of the vertical sawtooth signal at the approximate center of the raster trace has increased to a value (assume 5 volts) which with the 5 volt sample signal over diode D3 in the third segment of the line trace, will overcome the 10 volt bias on clipper 10 to cause same to conduct.

The mixing of the vertical sweep voltage output from generator 9 with the output signals fed over diodes D1-D last followed by the clipping action of the clipper circuit 10 produces a series of video pulses in each line trace of the raster in which the width of each pulse is a function of the amplitude modulation provided by the storage units. In the case of the three signals used in the present example, the clipper will be enabled as shown at raster lines *a*, *b*, *c* by pulses over diodes D3, D2, D1 respectively, which position on the raster corresponds to the variation of elevation of the terrain at different azimuths in the path of the aircraft as detected by the radar set 1.

It is apparent that, absent further circuitry, once a sampling pulse from a bin is of a value sufficient with the vertical sawtooth to enable the clipper 10 in a line trace, the pulse from the same bin will in each successive line trace enable the clipper 10 and the portion below the first line trace provided by an input signal will therefore be white from such line to the bottom of the display.

As indicated herein, it has now been found that it is desirable to also produce a TV camera output on the same display area with a profile line display. However, if the TV camera video signals are coupled to the display means 16 of the patent disclosure, the solid presentation which appears below the profile line would block out a substantial part of the information represented by the TV camera video signals.

In the arrangement of FIG. 1 there is included a second clipper 10' which is biased to operate at a higher value which, in the present example, will be assumed to be 0.2 volts more positive, whereby a higher value signal will be required at the mixing point M to effect conduction of clipper 10'. By way of example, with reference to FIG. 3, if a +5-volt signal output over D3 from bin C3 is sufficient with the vertical sawtooth generator waveform to effect operation of clipper 10 (FIG. 3—bias 10) such signal will not be sufficient as added to the vertical sawtooth to overcome the bias for clipper 10' (FIG. 3—bias 10') whereby the second clipper 10' will not operate during such line trace. As the raster trace progresses, and the vertical sawtooth waveform increases 0.2 volt several lines further in the raster trace, the combined value of such signal and the vertical waveform as shown in FIG. 3 will be sufficient to enable clipper 10'.

As clipper 10 turns on, it is operative to provide a cutoff signal to gate 40 which thereupon blocks the signal output from clipper 10 to the video amplifier 11. In like manner, in the subsequent line traces for the raster, clipper 10' will block the video output signal over clipper 10 from being gated to the electron gun of cathode-ray tube 16, and only a thin profile line will be drawn on the display for the sector represented by the signal in bin B3. It will be apparent that the signals from the other bins will effect a corresponding operation of the clippers 10, 10' in each line trace, whereby a thin profile line will be drawn across the face of the target which represents the terrain profile detected by the radar circuit 1. The video signal input from TV camera 42 is fed via the video mixer 12 to the electron gun 16 for display in a normal television presentation and the thin profile line A,B,C...will be superimposed on the actual scene which has been detected by the video camera 42.

An adjustable resistor 37 is provided to permit adjustment of the bias for clipper 10', and thereby the width of the profile line which is drawn on the target of the cathode-ray tube 16.

As noted above, clipper circuits 10, 10' may be of the type shown in the above-identified patent. Gate 40 which as connected to the output of the clippers 10, 10' may, as shown in FIG. 4, comprise a first tube 50 which is biased to normally conduct by resistor 51, and which is cut off as a signal is provided by clipper 10, whereby a positive video signal is fed over output conductor 55 to the video amplifier 11.

As described above, clipper 10' is not enabled for several subsequent raster lines of the trace. At such time, as the raster progresses to the point at which clipper 10' is enabled, the output signal of clipper 10' biases tube 52 off (normally biased on by resistor 57) and the positive voltage at the plate of tube 52 turns tube 56 on so that the signal on conductor 55 drops to a negative value, and remains at a negative value as long as tubes 52, 56 are thus conditioned even though tube 50 is enabled to conduct.

I claim:

1. In a radar display system having display means for providing a raster presentation, TV camera means for providing video signals to present a video picture on said raster, signal means for providing signals representative of terrain information in a given sector scan, and means for enabling said display means to provide segments of a terrain profile line on said raster including a first means for generating a video signal representative of a segment of the terrain profile at one line at least in the vertical raster trace which is determined by the value of the signal received from said signal means, a second means for coupling said video signals to said display means, and a third means for blocking passage of the video signal over said second means after a further number of lines in said radar trace, to thereby present a profile line segment of a measured width on said display means in overlay relation to the video display provided by said TV camera display.

2. A system as set forth in claim 1 in which said signal means have input means for providing terrain representative signals detected by a radar set at a relatively low frequency, storage means for storing said signals, and readout means for providing such signals to said first and third means at the horizontal rate of said raster.

3. A system as set forth in claim 1 in which said signal means includes means for providing said signals representative of the terrain information to said first and third means at the horizontal rate of said raster, and in which said signal means includes sawtooth generator means for providing a sawtooth waveform at the vertical rate to said first and third means, whereby the signal level input to said first and third means at any given time is determined by the instantaneous value of said sawtooth signal and the signal representative of the terrain information at such time, and which includes means for biasing said first means to operate at a different signal level than said third means.

4. A system as set forth in claim 1 in which said signal means includes means for providing said signals representative of the terrain information to said first and third means at the horizontal rate of said raster and a sawtooth signal at the vertical rate of the raster, and in which said first means includes switch means which operate to produce a video signal output responsive to the combined value of the terrain representative signal and the instantaneous value of said sawtooth signal exceeding a predetermined value, and in which said second means includes gate means connected between said first means and said display means, and said third means includes means connected to control said gate means to block said video output of said first means to said display means at a later line trace in the raster.

5. A system as set forth in claim 1 in which said signal means for providing signals representative of the terrain along a path include means for providing a train of signals comprised of a different signal for different ones of a plurality of increments in a horizontal line trace, each of which represents a different bit of terrain data, and in which said train of signals is fed to said first and third means to enable generation of a profile line on said display of substantially uniform width and in overlying relation with the video display provided by said camera means.

6. In a radar display system having display means for providing a raster presentation, signal means for providing a train of signals at the horizontal rate of the raster representative of terrain information in a given sector scan and a vertical sawtooth at the vertical rate of the raster, a first means controlled by said train of signals and said vertical sawtooth for generating video signals representative of the terrain profile in said sector, a second means for coupling said video signals to said display means, a third means for blocking said video signals generated by said first means from said display means, and bias means for biasing said first and third means to operate at different times in the same raster trace.

7. A system as set forth in claim 6 in which said first and third means are clipper circuits, and in which said bias means controls operation of the one clipper circuit at an earlier time in each raster trace than the other of said clipper circuits.

8. In a radar display system having display means for providing a raster presentation, TV camera means for providing video signals to present a video picture on said raster, signal means for providing signals representative of terrain information along a given sector scan including input means over which a train of signals representative of the terrain are received at a first frequency, storage means for storing each of the different signals in the train in a different storage bin, readout means for sampling the signals in each of said storage bis at the horizontal rate of the raster, and means for enabling said display means to provide a terrain profile line on said raster including a first means for generating video signals representative of the terrain profile at different horizontal lines in the raster trace as determined by the value of each signal received over said input means, second means for coupling the video signals to said display means, and a third means for blocking the video signals from said display means after a further number of lines short of the entire raster trace, to thereby present a profile line segment of a measured width on said display means in overlay relation to said video picture.

9. A system as set forth in claim 8 in which said readout means includes signal derivation means for each storage bin comprising a mixing diode and a transistor connected as an emitter-follower between each storage bin and said mixing diode.

10. A system as set forth in claim 9 in which said mixing diodes for each of the storage bins are connected over a common resistor to a common reference potential, and are connected common to the input for said first and third means.

11. A system as set forth in claim 8 in which said readout means includes a source of readout pulses and signal derivation means for each storage bin, each of which comprises a mixing diode, and a transistor having a base element connected to the associated storage bin and said source of readout pulses, an emitter connected to a mixing diode, and a collector connected to a source of potential.

12. A system as set forth in claim 11 in which said source of readout pulses provides said pulses at the horizontal rate of the raster.

13. In a radar display system having display means for providing a raster presentation, TV camera means for providing video signals to present a video picture on said raster, signal means for providing a train of signals at the horizontal rate of the raster which are representative of terrain information in a given sector scan, and means for enabling said display means to provide a terrain profile line on said raster in overlying relation with the video picture, including a first means for generating the upper margin of the terrain profile at different ones of the horizontal lines which are determined by the value of the different signals in the train received from said signal means, and means responsive to the same signals for blocking passage of the video signals generated by the first means after a further number of lines are traced in said raster trace to provide a lower margin for the profile line whereby a profile line segment of a measured width on said display means is provided in overlying relation to the video display provided by said TV camera display.

* * * * *